UNITED STATES PATENT OFFICE.

REINHOLD BECKER, OF CREFELD, GERMANY.

HIGH-SPEED TOOL-STEEL.

1,096,669.     Specification of Letters Patent.     Patented May 12, 1914.

No Drawing.     Application filed August 7, 1913. Serial No. 783,599.

*To all whom it may concern:*

Be it known that I, REINHOLD BECKER, subject of the German Emperor, residing at Crefeld, Germany, have invented certain new and useful Improvements in High-Speed Tool-Steels, of which the following is a specification.

This invention relates to the manufacture of high speed tool steel and has for its object to produce a high speed tool steel which shall be of great efficiency and be capable of cutting at high temperatures.

In the specification of my copending application for a United States Patent Serial No. 734796 filed December 3, 1912, I have described a high speed tool steel produced by the addition of cobalt to the known compositions hitherto employed in the manufacture of high speed tool steels, which comprise, essentially, steel having a low percentage of carbon and containing tungsten and chromium.

The present invention relates to the manufacture of the high speed tool steel outlined in the aforesaid specification and is the outcome of extensive experiments made in connection therewith.

According to the present invention the high speed tool steel is produced from the following composition, namely: steel containing about 0.70% of carbon, about 5% of chromium, about 18% of tungsten, and about 4% of cobalt. It will also be understood that the steel may also contain small quantities of other metals such as hitherto employed in the manufacture of high speed tool steels.

I claim:

A high speed tool steel containing about 0.70% of carbon, about 5% of chromium, about 18% of tungsten and about 4% of cobalt.

In testimony whereof I affix my signature in presence of two witnesses.

REINHOLD BECKER. [L. S.]

Witnesses:
    HELEN NUFER,
    JULIUS FESTNER.